(12) United States Patent
Nowosielski et al.

(10) Patent No.: US 11,610,511 B2
(45) Date of Patent: Mar. 21, 2023

(54) WORKING TOOL AND MANIPULATION AND MEASUREMENT SET OF LAPAROSCOPIC TRAINER

(71) Applicant: LAPARO SP. Z O.O., Wroclaw (PL)

(72) Inventors: Radoslaw Nowosielski, Opole (PL); Mateusz Rulewicz, Wroclaw (PL)

(73) Assignee: LAPARO SP. Z.O.O, Wroclaw (PL)

( * ) Notice: Subject to any disclaimer, the term of this patent is extended or adjusted under 35 U.S.C. 154(b) by 185 days.

(21) Appl. No.: 16/979,211

(22) PCT Filed: Mar. 8, 2019

(86) PCT No.: PCT/IB2019/051888
§ 371 (c)(1),
(2) Date: Sep. 9, 2020

(87) PCT Pub. No.: WO2019/171339
PCT Pub. Date: Sep. 12, 2019

(65) Prior Publication Data
US 2020/0410899 A1 Dec. 31, 2020

(30) Foreign Application Priority Data
Mar. 9, 2018 (PL) .......................................... 424841

(51) Int. Cl.
*G09B 23/28* (2006.01)
*G09B 23/32* (2006.01)

(52) U.S. Cl.
CPC ........... *G09B 23/285* (2013.01); *G09B 23/32* (2013.01)

(58) Field of Classification Search
CPC ............................... G09B 23/285; G09B 23/32
See application file for complete search history.

(56) References Cited

U.S. PATENT DOCUMENTS

| 5,403,191 A | 4/1995 | Tuason |
| 11,369,443 B2 * | 6/2022 | Shelton, IV ....... A61B 17/3421 |
| 2005/0142525 A1 | 6/2005 | Cotin et al. |

FOREIGN PATENT DOCUMENTS

| EP | 2922048 A4 | 10/2015 |
| WO | WO2009094621 A3 | 10/2009 |

OTHER PUBLICATIONS

Internationl Search Report for Priority Document PCT/IB2019/051888.
Written Opinion for Priority Document PCT/IB2019/051888.

* cited by examiner

*Primary Examiner* — Robert P Bullington, Esq.
(74) *Attorney, Agent, or Firm* — Jacob Eisenberg

(57) ABSTRACT

This disclosure relates to a working tool of a laparoscopic trainer having the form of a sleeve provided with a handle with a fixed arm and a movable arm with a rigid tie rod for manipulating the jaws of the working tip. The working tool includes a sensor unit detecting the opening of jaws of the working tip, housed within the handle of the working tool which comprises the first reflection sensor and the first reflector, wherein one of these elements of the opening sensor is attached to the handle of the working tool, and the other is mounted on the tie rod. This disclosure relates also to a manipulation and measurement set of a laparoscopic trainer, including a working tool according to the disclosure and a trocar, wherein the trocar has a guide channel for the slidable placement of the working tool therein.

6 Claims, 3 Drawing Sheets

WORKING TOOL AND MANIPULATION AND MEASUREMENT SET OF LAPAROSCOPIC TRAINER

CROSS REFERENCE TO RELATED APPLICATIONS

This application is a national phase of International Application No.: PCT/162019/051888, filed on 8 Mar. 2018, which claims priority to Polish Patent Application P.424841 filed on 9 Mar. 2018. The contents of the above-references applications are expressly incorporated herein by reference to their entireties.

FIELD OF THE INVENTION

The invention relates to a working tool and a manipulation and measurement set of a laparoscopic trainer, used to train and practice specific manual skills needed to perform minimally invasive surgery with a laparoscopic technique.

The working tool and the manipulation and measurement set according to the invention are applicable especially in trainers improving the learning and improvement of the operating technique, comprising automated evaluation of the training performed and enabling the tracking of the learning curve.

A US patent application US2005142525 discloses a training device for surgical laparoscopic procedure. The device comprises a tracking system for tracking the position of one or more working instruments during a training procedure and for objective assessment of trainee performance based on indicators using the position information of the operating instrument. The information about the instrument position over the course of the training procedure can be compared to instrument position information when it is used by experts to generate the results of the analysis. The device has a working tool in the form of a tubular sleeve, ended on one side with a handle with a fixed arm and a movable arm, and on the other side comprising a grasping member. The working tool is located in a trocar shaft at the depth determined by the limiter. The working tool comprises a hall sensor for tracking the position of the grasping member. The sensor can be located off-axis from the shaft of the working tool. The device has also roll and axial motion encoders.

A European patent EP2922048 discloses a hybrid laparoscopic simulator. The simulator according to the invention is fitted with laparoscopic instrument imitators. Each of the laparoscopic instrument imitators is made in the form of a real instrument and includes a sensor unit, and additionally is independent of trocar imitators, each of the trocar imitators is coupled to a corresponding displacement node of the trocar imitator, and the position of the trocar imitator on an anterior wall of the abdominal cavity of the robot-patient is traced and determined. The imitator of the laparoscopic instrument located in the channel trocar holder comprises a longitudinal rod with a tip provided with forceps controlled with the handle arms on the opposite side of the rod. The laparoscopic instrument handle is ended with a flange nut below which there is a set of sensors containing a microcontroller, a rod rotation sensor, a sensor detecting the opening of the forceps at the rod tip, an infrared LED cooperating with the laparoscopic tool type detection sensor located in the trocar. The trocar body frame comprises a longitudinal motion detection sensor, X- and Y-direction rotation sensors, and the longitudinal rod of the laparoscopic imitator is guided in the trocar body frame by a guideway unit with holding rollers.

A US patent specification US5403191 discloses a laparoscopic trainer whereby an individual user can practice endoscopic surgical procedures by duplicating the operative steps performed on actual true to life condition in order to learn the art and constantly improve the skill of eye-hand coordination skills and manual dexterity. Surgical instruments placed in trocars are inserted inside the device through the pre-established apertures on the transparent plastic panel and the instruments are manipulated while performing the practice procedure without the need to see them directly during the training. The trainee imitates and directs the instrument using the endoscopic-video-monitor system or by similar indirect viewing method mimicking a real life operative condition.

The purpose of the invention is to provide a simple and functional construction of a working tool and a manipulation and measurement set of a laparoscopic trainer enabling manual and virtual laparoscopic training.

BACKGROUND

The object of the invention is a working tool of a laparoscopic trainer having the form of a sleeve provided with a handle (6) with a fixed arm (7) and a movable arm (8) with a rigid tie rod (9) for manipulating the jaws (5) of the working tip (4), characterized in that it includes a sensor unit (10) detecting the opening of jaws (5) of the working tip (4), housed within the handle (6) of the working tool (1) which comprises the first reflection sensor (11) and the first reflector (12), wherein one of these elements of the opening sensor (10) is attached to the handle (6) of the working tool (1), and the other is mounted on the tie rod (9).

The object of the invention is also a manipulation and measurement set of a laparoscopic trainer, comprising a working tool (1) according to the invention and a trocar (2), wherein the trocar has a guide channel (15) for the slidable placement of the working tool (1) therein.

Preferably, the set includes a sensor unit for measuring the insertion depth of the working tool (1) which comprises a second reflection sensor (21) attached to the trocar and a second reflector (13) attached to the working tool (1).

Preferably, the second reflection sensor (21) is located in the trocar (2), and the trocar (2) has in its lid (14) at least one through hole (17) for the light beam, located opposite to the second reflection sensor (21).

Preferably, the set includes a sensor unit for measuring the rotation of the working tip (4) which includes an encoder disc (25) rotatably mounted in the axis of the guide channel (15) and an encoder sensor (23) for measuring the rotation of the encoder disc (25).

Preferably, the encoder disc (25) is connected, preferably by a sleeve holder (24), to a pressing unit (26) with pressure rollers (27).

Preferably, the set includes a sensor (20) detecting the presence of the working tool, located centrally in the axis of the guide channel (15).

Preferably, the set includes a tilt sensor of the working tool in two axes, preferably in the form of a MEMS sensor (22).

Preferably, the trocar includes a horizontal plate (18) with a central hole (19), located in the axis of the guide channel (15), on which the second reflection sensor (21) and/or the sensor (20) detecting the presence of the working tool (1) and/or the tilt sensor of the working tool and/or the encoder sensor (23) are located.

Preferably, the set comprises a working tool (1) and a trocar (2), where the working tool (1) has the form of a sleeve provided with a handle (6) with a fixed arm (7) and a movable arm (8) with a rigid tie rod (9) for manipulating the jaws (5) of the working tip (4) and is equipped with a sensor detecting the opening of the working tip jaws, the funnel-shaped trocar has a guide channel (15) for slidably fastening the working tool therein, and a pressing unit (26) with pressure rollers (27) for guiding the working tool (1), and is equipped with sensors to determine the necessary parameters characterizing the operation of the working tool including the sensor (20) detecting the presence of the working tool, the sensor for measuring the insertion depth of the working tool, the sensor detecting the type of the working tool, the tilt sensor of the working tool in two axes, the rotation sensor of the tool working tip, and the encoder with a rotating disk, wherein the sensor (5) detecting the opening of jaws (4) of the working tip (4) includes the first reflection distance sensor (11), mounted permanently in the handle (6) of the working tool (1), and the first reflector (12), placed below or above it, which is fixed perpendicularly to the rigid tie rod (9), connected to the end of the movable arm (8) of the handle (6), whereas between the upper end of the sleeve (3) and the bottom of the handle (6) there is a centrally mounted second flat reflector (13) from the second reflection sensor (21) for measuring the insertion depth of the working tool (1), which is placed in the trocar (2), while the trocar (2) has in its cover (14) at least one through hole (17) for the light beam, and the second reflection sensor (21) for measuring the insertion depth of the working tool (1), mounted in the through hole, is located opposite to the through hole (17), whereas the encoder sensor (23) for measuring the rotation of the working tip (4) of the working tool (1) is attached opposite to the external part of the encoder disk (25), which via the sleeve holder (24), is rotatably fixed in the axis of the guide channel (15), whereas the sensor (20) detecting the presence of the working tool is centrally located in the axis of the guide channel (15).

The working tool and the manipulation and measurement set according to the invention are characterised by a simple construction that allows manual training as well as virtual training, thus contributing to reduction of the training costs. It also allows the fully functional laparoscopic instruments to be used in training, whereby the medical simulation is close to the conditions prevailing in the operating room.

The sensor detecting the opening of jaws of the working tool is hidden inside the handle, so it does not hinder the manipulation of the tool. The use of a reflection sensor together with a reflector allows unobtrusive mounting inside the tool handle. Such a solution does not change the external shape of the laparoscopic tool, which makes the simulation faithfully reproducing the reality.

The use of sensors in the manipulation and measurement set to determine the parameters characterizing the operation of the working tool allows straightforward calculation of the movement trajectory of the working tool tip after completed training. The possibility of recovering the trajectory of movement of the working tool tip, after the completed training, allows for full analysis of the efficiency and smoothness of movement of the working tool.

The manual training can be analyzed in terms of the following parameters: travelled distance of the working tool tip, instantaneous velocities and accelerations of the working tool, number of clamps of the working tip of the working tool, smoothness of the working tool movement—visibility of the working tool in the camera field of view.

The laparoscopic training of the basic skills and sewing will be able to be performed manually on physical objects, while the surgical procedure training will be performed in a simulated virtual environment. It rules out the need to use expensive disposable organ imitating cartridges.

BRIEF SUMMARY OF THE DRAWINGS

The object of the invention is illustrated in an embodiment in the accompanying drawing, wherein.

DETAILED DESCRIPTION

Figure 1:
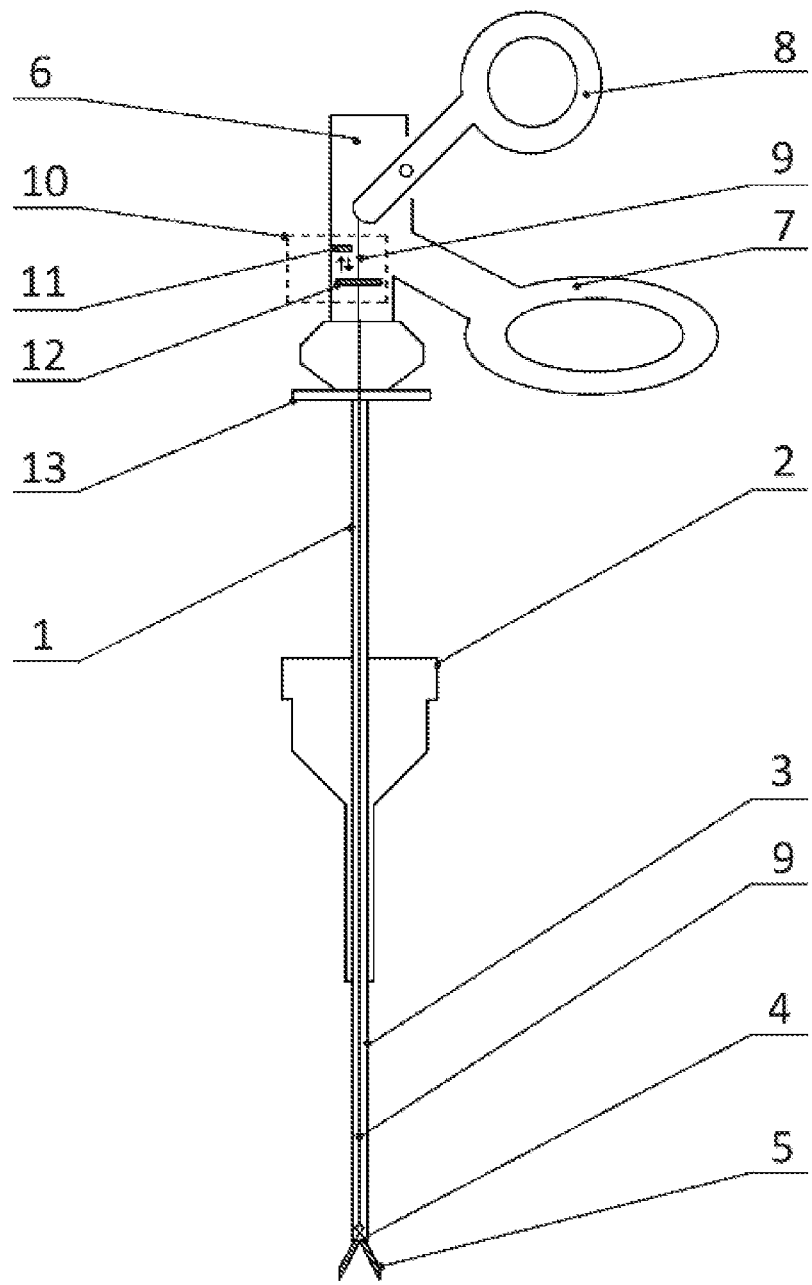
FIG. 1 shows schematically a manipulation and measurement set of a laparoscopic trainer in longitudinal section.
Figure 2:
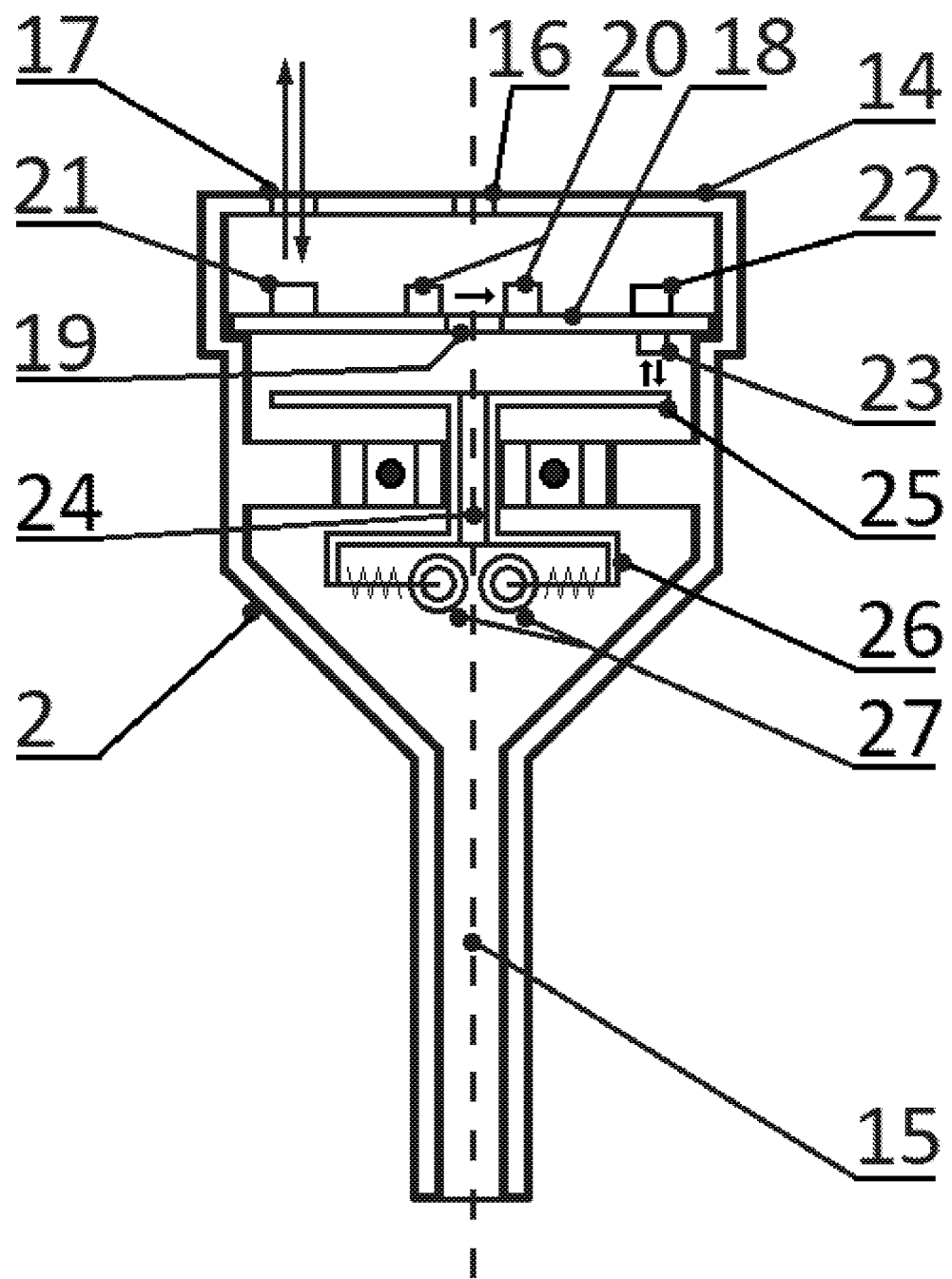
FIG. 2 shows schematically a trocar from a manipulation and measurement set of a laparoscopic trainer in longitudinal section.

FIG. 1 and FIG. 2 show a manipulation and measurement set, composed of a working tool 1 and a trocar 2. The working tool 1 comprises a sleeve 3 provided at the bottom with a working tip 4 with jaws 5 and at the top with a handle 6 with a fixed arm 7 and a movable arm 8 for manipulating the jaws 5 of the working tip 4 by a rigid tie rod 9. The handle 6 comprises a sensor unit 10 detecting the opening of jaws 5 of the working tip 4, which comprises the first reflection distance sensor 11 fixed permanently in the handle 6 of the working tool 1 and the first flat reflector 12 for light reflection located below it, fixed perpendicularly to a rigid tie rod 9, connected to the end of the movable arm 8 of the handle 6. Between the upper end of the sleeve 3 and the bottom of the handle 6 there is a centrally mounted second flat reflector 13 for light reflection from the second reflection sensor (21) for measuring the insertion depth of the working tool.

The trocar 2 has a funnel-shaped body closed from the top by a cover 14. Inside the body there is an axially located guide channel 15 for the working tool 1. The trocar cover 2 has an introduction hole 16 for the working tool 1, arranged in the axis of the guide channel 15 and a through hole 17 for the light beam. Under the trocar 2 cover 14 there is a horizontal plate 18 with a central hole 19 positioned in the axis of the guide channel 15. On the horizontal plate 18 of the trocar 2 are placed the sensors detecting the presence of the working tool 20, located near the central hole 19, the second reflection sensor 21 for measuring the insertion depth of the working tool 1 in the form of an optical distance sensor, which is located under the through hole 17 in the cover 14 of the trocar 2, and the MEMS 22 sensors which are used to measure the trocar tilt in two axes. The MEMS sensors 22, i.e., a 3-axis accelerometer, a 3-axis gyroscope and a 3-axis magnetometer inform about the tilt angles of the axis of the working tool 1. At the bottom of the horizontal plate 18 of the trocar 2, an encoder sensor 23 is mounted to measure the rotation of the working tip 4 of the working tool 1. Below the horizontal plate 18 of the trocar 2, the encoder disc 25 is rotatably fixed through the sleeve holder 24 in the axis of the guide channel 15, the rotation of the disc being measured by the encoder sensor 23. A pressing unit 26 with pressure rollers 27 allowing straight-line guiding of the working tool 1 in the guide channel 15 is attached to the lower part of the sleeve holder 24 of the encoder disk 25. The pressing unit 26 with the pressure rollers 27 provides resistance during rotation of the sleeve 3, so that the encoder disk 25 rotates together with rotation of the sleeve 3.

Example 2

Figure 3:
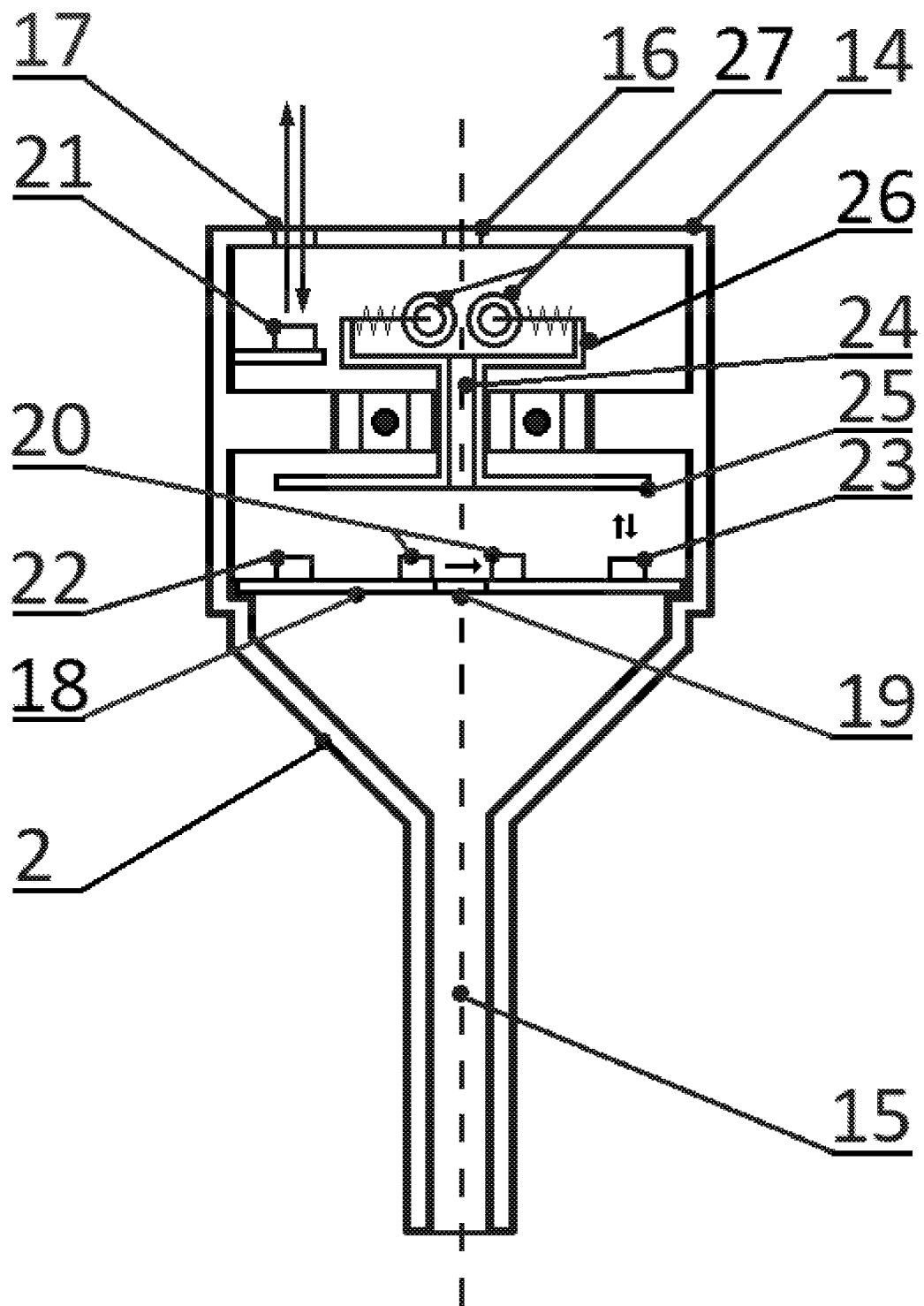
FIG. 3 shows alternative scheme of a trocar in longitudinal section.

FIG. 1 and FIG. 3 show a manipulation and measurement set with an alternative trocar fabricated as in Example 1, with the difference that the horizontal plate 18 with a central hole 19 is placed at the bottom of the trocar 2, above the guide channel 15, wherein the encoder sensor 23 for measuring the rotation of the working tip 4 of the working tool, fixed to it, is located on its upper surface. The encoder disc 25, in turn, is attached, via the sleeve holder 24, above the horizontal plate 18, while the pressing unit 26 with the pressure rollers 27 is attached to the upper part of the sleeve holder 24.

The invention claimed is:

1. A manipulation and measurement set of a laparoscopic trainer, comprising:
    a working tool, and
    a trocar, and
    wherein the working tool comprises a form of a sleeve provided with a handle with a fixed arm and a movable arm with a rigid tie rod configured to manipulate jaws of a working tip,
    wherein the trocar comprises a guide channel configured for slidable placement of the working tool therein,
    wherein the manipulation and measurement set further comprises at least one sensor unit configured to determine parameters characterizing an operation of the working tool, and
    where the manipulation and measurement set of a laparoscopic trainer further comprises first sensor unit configured to detect an opening of the jaws, arranged within a handle of the working tool, and includes a first reflection sensor and a first reflector, wherein one of the first reflection sensor and the first reflector is attached to the handle and another of the first reflection sensor and the first reflector is mounted on the rigid tie rod.

2. The manipulation and measurement set according to claim 1, further comprising a second sensor unit configured to measure insertion depth of the working tool, the second sensor unit comprising a second reflection sensor attached to the trocar and a second reflector attached to the working tool.

3. The manipulation and measurement set according to claim 2, wherein the second reflection sensor is arranged in the trocar, and the trocar comprises a lid having at least one through hole configured to pass a light beam and arranged opposite to the second reflection sensor.

4. The manipulation and measurement set according to claim 1 further comprising another sensor unit configured to measure rotation of the working tip, the another sensor comprising an encoder disc rotatably mounted in an axis of the guide channel and an encoder sensor configured to measure rotation of the encoder disc.

5. The manipulation and measurement set according to claim 4, wherein the encoder disc is connected to a pressing unit with pressure rollers.

6. The manipulation and measurement set according to claim 5, wherein the encoder disc is connected by a sleeve holder to the pressing unit.

* * * * *